United States Patent [19]
Cullen

[11] Patent Number: 4,853,266
[45] Date of Patent: * Aug. 1, 1989

[54] LIQUID ABSORBING AND IMMOBILIZING PACKET CONTAINING A MATERIAL FOR TREATING THE ABSORBED LIQUID

[75] Inventor: John S. Cullen, Buffalo, N.Y.

[73] Assignee: Multiform Desiccants, Inc., Buffalo, N.Y.

[*] Notice: The portion of the term of this patent subsequent to May 31, 2005 has been disclaimed.

[21] Appl. No.: 168,052

[22] Filed: Mar. 14, 1988

[51] Int. Cl.[4] .......................... B27N 5/02; B65D 81/26
[52] U.S. Cl. ...................................... 421/35.7; 428/76;
428/195; 428/200; 428/201; 428/211; 426/124;
206/204; 206/524.7
[58] Field of Search ................ 428/35, 195, 76, 200,
428/201, 211, 35.7; 206/204, 524.7; 426/124

[56] References Cited

U.S. PATENT DOCUMENTS

| | | | |
|---|---|---|---|
| 2,283,867 | 5/1942 | Flosdorf et al. | 312/31 |
| 3,990,872 | 11/1976 | Cullen | 55/274 |
| 4,124,116 | 11/1978 | McCabe, Jr. | 206/204 |
| 4,603,069 | 7/1986 | Haq et al. | 428/76 |
| 4,615,923 | 10/1986 | Marx | 428/35 |

FOREIGN PATENT DOCUMENTS

| | | | |
|---|---|---|---|
| 1362935 | 7/1962 | France | 206/524.7 |
| 711186 | 6/1954 | United Kingdom | 206/204 |

*Primary Examiner*—Ellis P. Robinson
*Assistant Examiner*—P J. Ryan
*Attorney, Agent, or Firm*—Joseph P. Gastel

[57] ABSTRACT

A packet for absorbing and immobilizing a liquid including an envelope which is degradable in the liquid and a liquid absorbing and immobilizing material in the envelope. One or more of a biocide, fungicide, antimicrobial, bacteriostat, sanitizer, disinfectant, scent or deodorizer is added to the liquid absorbing and immobilizing material for treating the liquid which is absorbed. The envelope has a dot matrix coating of heat-fusible material on degradable starch paper. The dot matrix coating permits heat-sealing of the envelope leaving the uncoated portions of the starch paper to degrade in solutions in which the dot matrix coating is insoluble.

18 Claims, 1 Drawing Sheet

U.S. Patent
Aug. 1, 1989
4,853,266
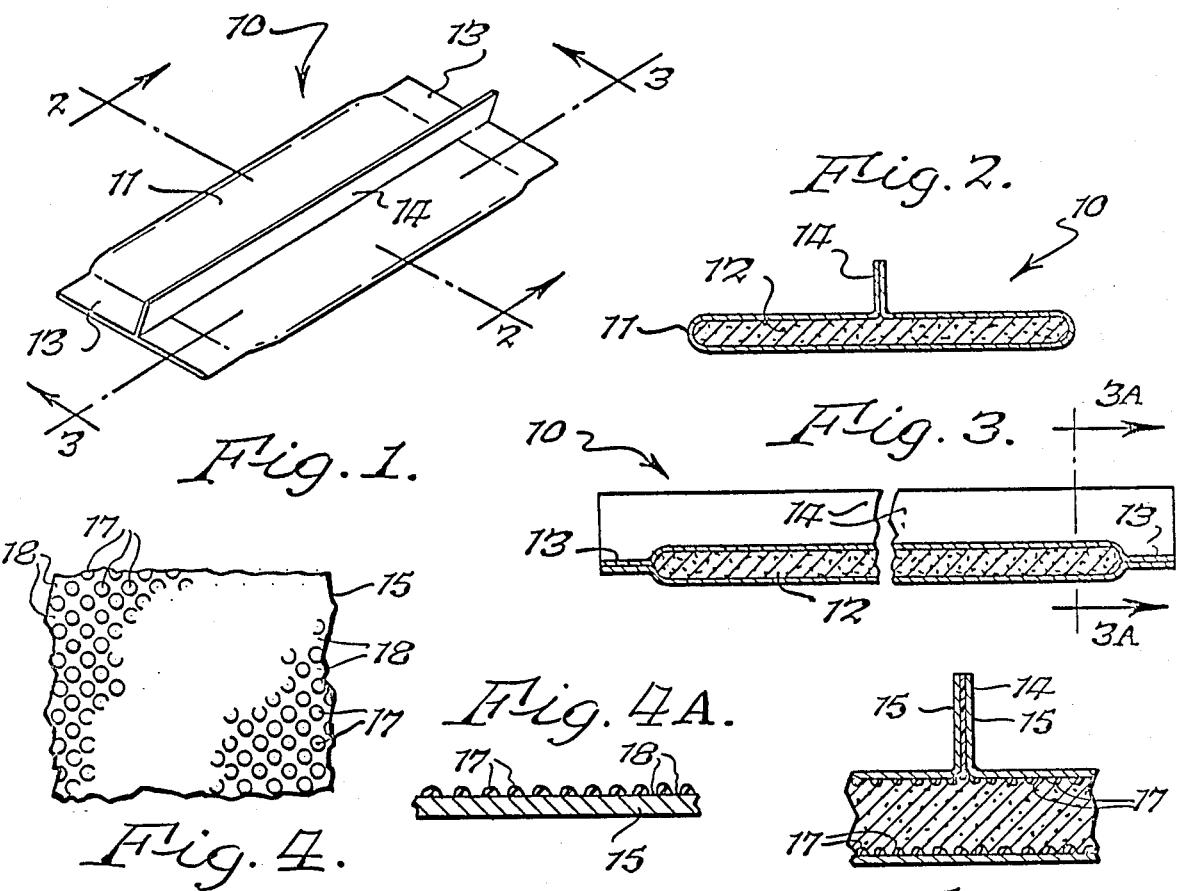
Fig. 1.
Fig. 2.
Fig. 3.
Fig. 4.
Fig. 4A.
Fig. 3A.
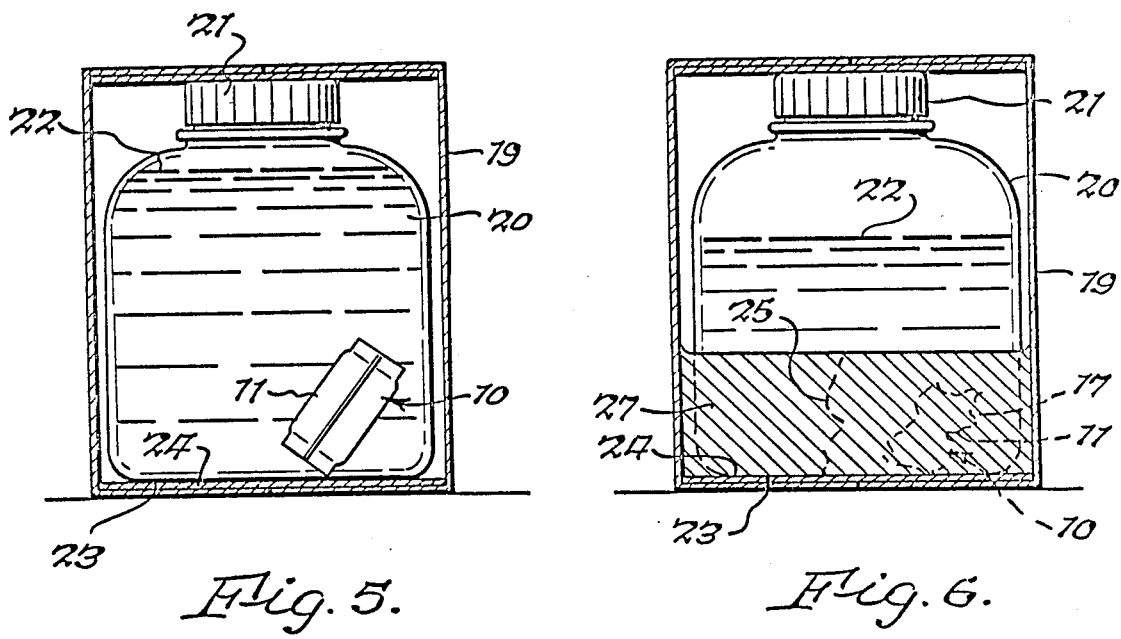
Fig. 5.
Fig. 6.

LIQUID ABSORBING AND IMMOBILIZING PACKET CONTAINING A MATERIAL FOR TREATING THE ABSORBED LIQUID

BACKGROUND OF THE INVENTION

The present invention relates to an improved packet of material for absorbing, and treating a immobilizing liquid after the liquid comes in contact therewith.

By way of background, the liquid absorbing and immobilizing character of sodium polyacrylate is known. A small amount of this material will absorb and immobilize a relatively large quantity of an aqueous solution by forming a gel-like material when it reacts therewith. In copending applications Ser. No. 863,722, filed May 16, 1986, now U.S. Pat. No. 4,749,600, dated June 7, 1988, and Ser. No. 877,095, filed June 20, 1986, now U.S. Pat. No. 4,748,069, dated May 31, 1988, a packet is disclosed which contains sodium polyacrylate in a degradable starch paper envelope. When the aqueous solution comes into contact with the envelope, it degrades it, and the sodium polyacrylate absorbs and immobilizes the solution. The packet is generally packaged within a box on the outside of a container of liquid, and if the container breaks, the envelope of the packet dissolves and the material therein absorbs and immobilizes the liquid, thereby preventing a mess which would otherwise be made. However, the sodium polyacrylate functioned only to absorb and immobilize the aqueous solution, it did not specifically treat the solution to prevent other detrimental effects. In this respect, the aqueous solution could have had bacteria, fungi, microbes, viruses, etc. therein which were not treated and incapacitated during the absorbing and immobilizing action.

SUMMARY OF THE INVENTION

It is the object of the present invention to provide an improved packet containing material for not only absorbing and immobilizing liquids with which it may come into contact but also for chemically treating such liquid to neutralize any organisms or odors therein. Other objects and attendant advantages of the present invention readily will be perceived hereafter.

The present invention relates to a packet for absorbing and immobilizing a liquid comprising an envelope which is degradable in said liquid, a first material in said envelope for absorbing and immobilizing said liquid, and a second material in said envelope for additionally treating said liquid to nullify a specific undesirable quality thereof.

The present invention also relates to an absorbent packet in an outer container having an inner container with liquid from which said liquid can leak, said absorbent packet being located between said inner and outer containers for absorbing and immobilizing said liquid within said outer container in the event of leakage of said liquid from said inner container comprising an envelope which is degradable in said liquid, a first material in said envelope for absorbing and immobilizing said liquid, and a second material in said envelope for additionally treating said liquid to nullify a specific undesirable quality thereof.

The various aspects of the present invention will be more fully understood when the following portions of the specification are read in conjunction with the accompanying drawings wherein:

BRIEF DESCRIPTION OF THE DRAWINGS

FIG. 1 is a perspective view of the absorbent packet of the present invention;

FIG. 2 is a cross sectional view taken substantially along line 2—2 of FIG. 1;

FIG. 3 is a fragmentary cross sectional view taken subtantially along line 3—3 of FIG. 1 with the dot matrix portion shown in disproportionate enlargement;

FIG. 3A is a fragmentary cross sectional view taken substantially along line 3A—3A of FIG. 3;

FIG. 4 is a greatly enlarged fragmentary plan view of the material of the envelope;

FIG. 4A is a fragmentary cross sectional view of the material which comprises the envelope;

FIG. 5 is a side elevational view, partially in cross section, showing an inner container of liquid located within an outer container with the degradable packet of absorbing and immobilizing material located therebetween while the inner container is intact; and FIG. 6 is a view similar to FIG. 5 but showing a rupture in the inner container and the liquid which leaked therefrom solidified after the degrading of the packet envelope.

DESCRIPTION OF THE PREFERRED EMBODIMENTS

The packet 10 for absorbing and immobilizing a liquid includes an envelope 11 of material which is degradable in the liquid, a liquid absorbing and immobilizing material 12 contained within envelope 11, and a material for chemically treating the liquid to neutralize or nullify any specific undesirable characteristic or quality thereof. The envelope 11 is formed of sheet material which is heat-sealed at end seams 13 and along a central seam 14. Preferably the sheet material from which envelope 11 is made includes a degradable starch paper 15 having a polyvinyl acetate uniform discontinuous coating 17 in a dot matrix pattern over its entire surface. The dot matrix pattern may have as many as 1,000 spaced dots per square inch, or any other suitable amount, with the spaces on the paper between the dots being uncoated. Alternatively, the envelope may be of the type disclosed in copending application Ser. No. 863,722, filed May 16, 1986, now U.S. Pat. No. 4,749,600, or it may be of any other suitable form.

When the envelope 11 is fabricated, the starch paper 15 is the outer layer and the dot matrix pattern of polyvinyl acetate is the inner layer. It is the polyvinyl acetate coating portions of envelope 11, when placed face-to-face which permits the seams 13 and 14 to be formed by heat-sealing, as depicted in FIG. 3A. While a dot matrix pattern has been disclosed in which the dots appear in the form of circles, it will be appreciated that any other suitable uniform discontinuous pattern is acceptable, provided it permits the starch paper to be adequately sealed. Furthermore, it will be appreciated that while seams 13 and 14 are formed by lapping the inner layer in face-to-face relationship, the seams, such as 14, may also be formed by lapping an inner surface to an outer surface.

In the present instance the degradable outer layer 15 of envelope 11 is a starch paper which is degradable in water and other liquids. A starch paper which has been used successfully is known under the trademark DISSOLVO and is a product of Gilbreth International Corporation, and it is obtainable in grades No. 2845 and No. 2800. It is a composition which includes between about 80-82% sodium carboxymethyl cellulose and about 18% wood pulp fiber and other trace materials such as calcium carbonate and titanium dioxide. However, the envelope may be of any other liquid-degradable material. The dot matrix pattern, or any other suitable discontinuous pattern, permits liquid, which may not otherwise be able to dissolve the material of coating 17, to completely degrade envelope 11 because there are uncoated spaces 18 between the dots of the coating 17 through which the liquid can pass. However, the special advantage of the dot matrix pattern is that the dots are extremely small so that even if they do not dissolve, the degraded envelope will be practically entirely disintegrated, whereas if the discontinuous pattern consisted of large areas of coating, complete disintegration might not be obtained even though the envelope itself was degraded.

The liquid absorbing and immobilizing material 12 is preferably sodium polyacrylate having the formula $(C_3H_3O_2Na)_n$. It is obtainable under the trademark Water lock J-550 from Grain Processing Corporation. This material is a free-flowing powder having the ability to absorb or immobilize large volumes of aqueous solutions including dilute alkalis, dilute acids and body fluids. The material 12 will absorb and immobilize 650 milliliters of water per gram of material or 75 milliliters of 1% sodium chloride solution per gram of material. The material 12 will perform the foregoing absorbing and immobilizing in about 25 seconds and added to this is the time which is required for the envelope 11 to degrade which is about another 30 seconds. Thus, when the packet 10 is immersed in liquids of the foregoing type, the absorbing and immobilizing process will take approximately one minute. Other liquid absorbing and immobilizing materials which may be used are by way of example and not of limitation a material known under the trademark Labsorb made by Lab Safety Supply Co.; a material known under the trademark Sorbaset made by Conmark, Inc.; and vermiculite.

In accordance with the present invention, the packet 10 preferably contains a second material for neutralizing or nullifying any undesirable or detrimental characteristic of the liquid which is being absorbed and immobilized. This second material, which may be mixed in a suitable amount with the immobilizing material, may be a biocide, fungicide, antimicrobial, bacteriostat, sanitizer, disinfectant, scent or deodorizer or a combination thereof. Thus, the material may be used, by way of example and not of limitation, for absorbing immobilizing and neutralizing spilled blood samples, urine, or other body fluids. It may also be used to neutralize or destroy bacteria or fungi in other liquids or to prevent growth of bacteria or fungi in liquids which may serve as a host therefor. In short, it is contemplated that by the addition of a suitable material of the foregoing type to the immobilizing material, any desired effect can be obtained for treating the liquid which is spilled in any desired manner.

By way of example and not of limitation, the following biocides can be mixed with the liquid absorbing and immobilizing material in any desired proportion. Such biocides may be sodium hypochlorite or calcium hypochlorite, a material known under the trademark Hth® manufactured by Olin; poly (hexamethylene biquanide hydrochloride), which is known under the trademark Baquacil® manufactured by ICI Americas, Inc.; chlorinated isocyanurates, known under the trademark Pace® manufactured by Olin, or known under the trademark Sun® manufactured by Monsanto; 1-(3-chlorallyl)-3,5,7 triaza 1-azoniaadamantane chloride, known under the trademark Dowicide 75 manufactured by Dow Chemical; 1,2 dibromo - 2,4 dicyanobutane, known under the trademark TEKTAMER 38 manufactured by Calgon Corporation; methlene dithiocyanate, known under the trademark Stauffer N-948, manufactured by Stauffer Chemical; 2,2-dibromo-3-nitrilopropionamide, known under the trademark Dbnpa manufactured by Dow Chemical U.S.A.; 5-chloro-2-methyl4-isothiazolin-3-one, known under the trademark Kathon Wt manufactured by Rohm and Haas Company; methylene dithiocyanate, known under the trademark Stauffer N-948 manufactured by Stauffer Chemical Company; glutaraldehyde, known under the trademark Ucarcide 250 manufactured by Union Carbide; 5-chloro-2-methyl-4-isothiazoline-3-one, known under the trademark Kathon Wt, manufactured by Rohm and Haas Company; 3,4,4'-trichlorocarbanilide (triclocarban), known under the trademark PREVENTOL OC-3034 manufactured by Mobay Chemical Corporation; 3,4,4'-trichlorocarbanilide, known under the trademark TCC manufactured by Monsanto Company; and 2,4,4'-trichloro2'-hydroxy-diphenyl ether, known under the trademarks Irgasan 300 and Dp triclosan manufactured by Ciba-Geigy Corporation.

The second material which may be mixed with the liquid absorber and immobilizing material may be a fungicide such as 2,4,5,6-tetrachloroisophthalonitrile, known under the trademark Chlorothalonilnopcocide N96 manufactured by Diamond Shamrock Corporation; 2-n-octyl-4-isothiazolin-3-one, known under the trademark Skane M-8, manufactured by Rohm and Haas Company; 3-iodo-3-propynyl butyl, known under the trademark Polyphase Af-1, manufactured by Troy Chemical Corporation; and N-(trichloromethylthio) phthalimide, known under the trademark Troysan antimildew o, manufactured by Troy Chemical Corporation.

The second material which may be mixed with the liquid absorber and immobilizing material may also be an antimicrobial such as chlorohexidinegludconate, known under the trademark CHG and manufactured by Lonza, or other suitable antimicrobials.

The second material which may be mixed with the liquid absorber and immobilizing material may also be a bacteriostat such as 3,4,4'-trichlorocarbanilide (trichlorcarbon) manufactured by Monsanto or Mobay; trichloroisocyanuric acid known under the trademark Acl®90 manufactured by Monsanto; or sodium dichloroisocyanurate (dihydrate) known under the trademarks Cdb® or Clearon manufactured by Olin.

The second material which may be mixed with the liquid absorber and immobilizing material may also be a sanitizer or disinfectant such as quaternary ammonium compound known under the trademark Bardac® and manufactured by Lonza; o-phenylphenol manufactured by DuBois Chemical; o-benzl-p-chlorphenol manufactured by Economics Laboratories, Inc.; or iodofors manufactured by GAF Corporation.

The second material which may be mixed with the liquid absorber and immobilizing material may also be a scent or a fragrance such as known under the various trade names Green, Floral, Aldehydic, Chypre note, Oriental, Leather and Tobacco, Fougere, Citrus and Pine.

All of the foregoing second materials have been given by way of example and not of limitation. It will be appreciated that any desired second material or combinations thereof may be included within the packet for effecting a specific function or functions.

In FIGS. 5 and 6, one mode of operation of packet 10 is disclosed. In this instance, packet 10 is inserted into outer container 19, which may be of any suitable material, such as paper, cardboard, wood or plastic, and it is located outside of inner frangible container 20 which may be of any suitable material, such as glass, ceramic or plastic. Inner container 20 includes a cap 21 which holds the liquid 22 sealed within inner container 20. While packet 10 is shown located between the sides of containers 19 and 20, it is preferable that it be located between the bottom 23 of inner container 20 and the bottom 24 of outer container 19 so that if there is leakage, the envelope 11 will start to degrade at the earliest possible time. While outer container 19 is shown in cross section in FIGS. 5 and 6, it will be appreciated that it completely surrounds inner container 20 to the extent that it will tend to capture any liquid which leaks from the inner container.

If for any reason inner container 20 should rupture, as by a crack 25 (FIG. 6) so that the liquid 22 will flow therethrough, the envelope 11 of packet 10 will start to degrade upon contact with the liquid. After it has degraded sufficiently, the material 12 will react with the liquid to absorb and immobilize it by forming a gel-like substance 27. In addition, the second material will treat the liquid to neutralize or nullify any particular characteristic thereof. In FIG. 6, the formation of the gel will act as a seal so that it will plug the crack 25, thereby causing a part of liquid 22 to be retained in its liquid form within container 20. If the container 20 broke to a greater extent, that is, more than a crack, so that all of the liquid 22 tended to flow therefrom, the entire amount of liquid would be formed into a gel-like substance, such as 27, provided that the outer container 19 could retain the liquid therein for a sufficient time for the envelope 11 to degrade and for the solidification to occur. In this respect, it is preferable that the outer container 19 be sufficiently leak-resistant so that the foregoing could occur.

It will be appreciated that the amount of material 12 which is required within envelope 11 for any particular situation will depend on the volume of inner container 20, that is, envelope 11 should contain enough material 12 to completely absorb and immobilize the entire amount of liquid.

While the material of envelope 11 has been shown as including a uniform continuous dot matrix coating 17 on its entire surface, it will be appreciated that in certain circumstances this dot matrix coating for effecting heat-sealing need be applied to only select portions of the material 15 which are to be sealed to each other. Furthermore, while the discontinuous coating 17 has been described as polyvinyl acetate, it will be appreciated that it can comprise any other material which will adhere to starch paper and which lends itself to heat-sealing or to other types of sealing during the formation of envelope 11.

While the present disclosure has been directed specially to an absorbing and immobilizing material which reacts with and treats aqueous solutions for undesirable characteristics, it will be appreciated that the principles of the present invention include the use of absorbing and immobilizing materials which operate with other liquids and the envelope may comprise materials other than starch paper which will degrade in such other solutions.

While a specific example has been shown in FIGS. 5 and 6, it will be appreciated that packets, such as 10, may be placed in contiguous relationship to a liquid-containing container which may not be enclosed within an outer container, to absorb and immobilize leaks therefrom, provided that leaking liquid can be restrained for a sufficient time for solidification to occur.

Insofar as relevant to the present application, the subject matter of applications Ser. No. 863,722, now U.S. Pat. No. 4,749,600, and Ser. No. 877,095, now U.S. Pat. No. 4,748,069, are incorporated by reference herein.

While preferred embodiments of the present invention have been disclosed, it will be appreciated that it is not limited thereto but may be otherwise embodied within the scope of the following claims.

What is claimed is:

1. A packet for absorbing and immobilizing a liquid comprising an envelope which is degradable in said liquid, a first material in said envelope for absorbing and immobilizing said liquid, and a second material confined in said envelope for additionally treating said liquid which is absorbed and immobilized to nullify a specific undesirable quality thereof.

2. A packet as set forth in claim 1 wherein said liquid absorbing and immobilizing material is sodium polyacrylate.

3. A packet as set forth in claim 1 wherein said envelope is fabricated from starch paper.

4. A packet as set forth in claim 1 wherein said envelope includes a patterned coating of sealing material thereon.

5. A packet as set forth in claim 1 wherein said second material is selected from the group of biocides, fungicides, antimicrobials, bacteriostats and disinfectants.

6. In an outer container having an inner container with liquid from which said liquid can leak, an absorbent packet located between said inner and outer containers for absorbing and immobilizing said liquid within said outer container in the event of leakage of said liquid from said inner container comprising an envelope which is degradable in said liquid, a first material in said envelope for absorbing and immobilizing said liquid, and a second material confined in said envelope for additionally treating said liquid which is absorbed and immobilized to nullify a specific undesirable quality thereof.

7. In an outer container having an inner container with liquid from which said liquid can leak as set forth in claim 6 wherein said envelope is fabricated from starch paper.

8. In an outer container having an inner container with liquid from which said liquid can leak as set forth in claim 6 wherein said absorbing and immobilizing material is sodium polyacrylate.

9. In an outer container having an inner container with liquid from which said liquid can leak as set forth in claim 6 wherein said envelope includes a patterned coating of sealing material thereon.

10. In an outer container having an inner container with liquid from which said liquid can leak as set forth in claim 6 wherein said second material is selected from the group of biocides, fungicides, antimicrobials, bacteriostats and disinfectants.

11. A packet for absorbing and immobilizing a liquid comprising a first material which will absorb and immobilize said liquid, a second material for additionally treating said liquid which is absorbed and immobilized to nullify a specific undesirable quality of said liquid, and means for containing said first and second materials while said means are dry and for releasing said first and second materials on contact of said means with said liquid to thereby permit said first and second materials to absorb and immobilize and treat said liquid.

12. A packet as set forth in claim 11 wherein said second material is selected from the group of biocides, fungicides, antimicrobials, bacteriostats and disinfectants.

13. A packet as set forth in claim 11 wherein said first material is sodium polyacrylate.

14. A packet as set forth in claim 13 wherein said second material is selected from the group of biocides, fungicides, antimicrobials, bacteriostats and disinfectants.

15. In an outer container having an inner container with liquid from which said liquid can leak, an absorbent packet located between said inner and outer containers for absorbing and immobilizing said liquid within said outer container in the event of leakage of said liquid from said inner container comprising a first material which will absorb and immobilize said liquid, a second material for additionally treating said liquid which is absorbed and immobilized to nullify a specific undesirable quality of said liquid, and means for containing said first and second materials and for releasing said first and second materials on contact of said means with said liquid to thereby permit said first and second materials to absorb and immobilize and treat said liquid and prevent leakage of said liquid from said outer container.

16. In an outer container having an inner container with liquid from which said liquid can leak as set forth in claim 15 wherein said second material of said packet is selected from the group of biocides, fungicides, antimicrobials, bacteriostats and disinfectants.

17. In an outer container having an inner container with liquid from which said liquid can leak as set forth in claim 15 wherein said first material is sodium polyacrylate.

18. In an outer container having an inner container with liquid from which said liquid can leak as set forth in claim 17 wherein said second material is selected from the group of biocides, fungicides, antimicrobials, bacteriostats and disinfectants.

* * * * *

UNITED STATES PATENT AND TRADEMARK OFFICE
CERTIFICATE OF CORRECTION

PATENT NO. : 4,853,266
DATED : August 1, 1989
INVENTOR(S) : John S. Cullen

It is certified that error appears in the above-indentified patent and that said Letters Patent is hereby corrected as shown below:

On the title page, after "[22] Filed: Mar. 14, 1988" insert

--[63] Related U.S. Application Data
Continuation-in-part of Ser. No. 863,722, May 16, 1986, Pat. No. 4,749,600, and a continuation-in-part of Ser. No. 877,095, June 20, 1986, Pat. No. 4,748,069--.

In column 1, line 5, insert the following:

--This is a continuation-in-part of application Ser. No. 863,722, filed May 16, 1986, now Pat. No. 4,749,600, dated June 7, 1988, and a continuation-in-part of application Ser. No. 877,095, filed June 20, 1986, now Pat. No. 4,748,069, dated May 31, 1988.--.

Signed and Sealed this

Third Day of May, 1994

Attest:

BRUCE LEHMAN

*Attesting Officer*     *Commissioner of Patents and Trademarks*